United States Patent Office 3,841,944
Patented Oct. 15, 1974

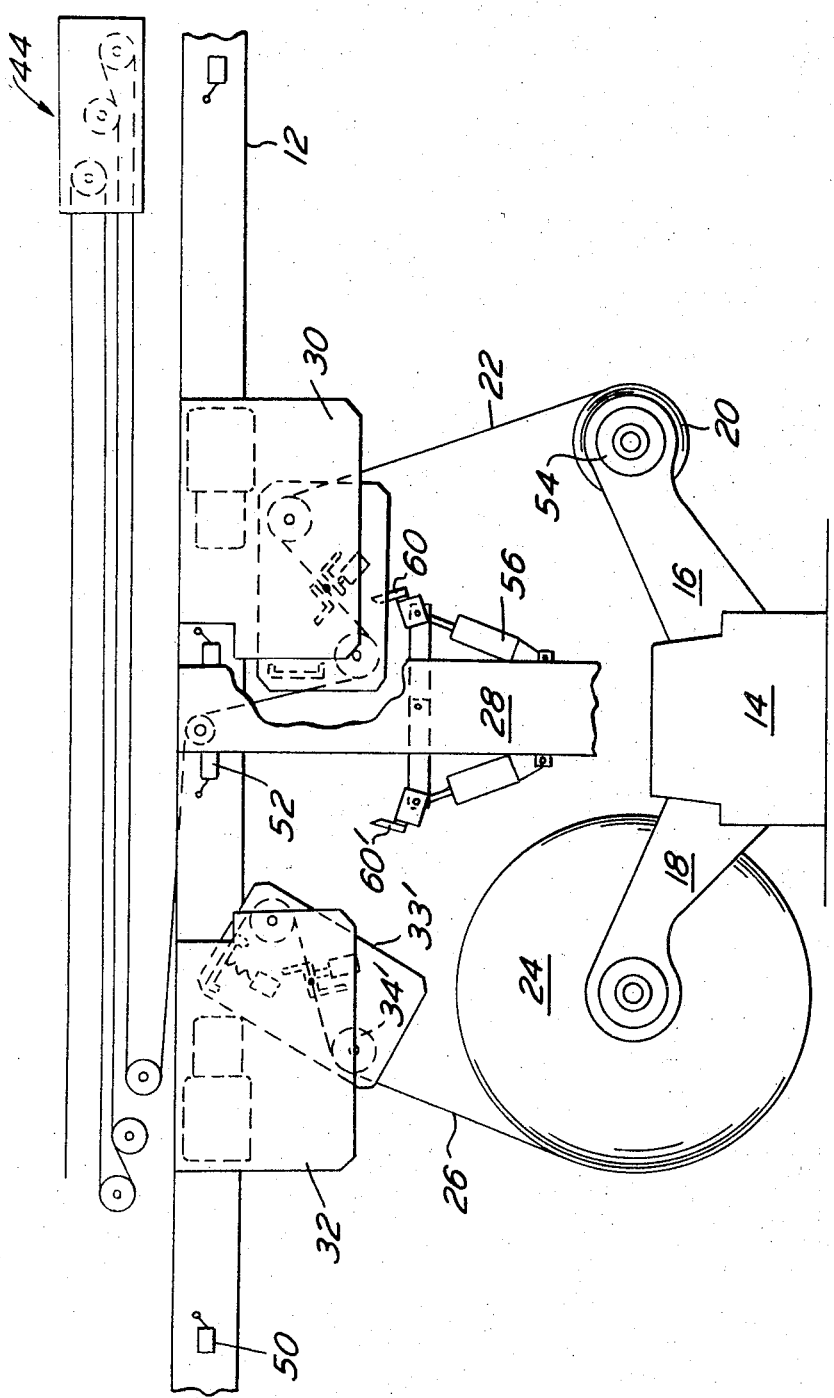

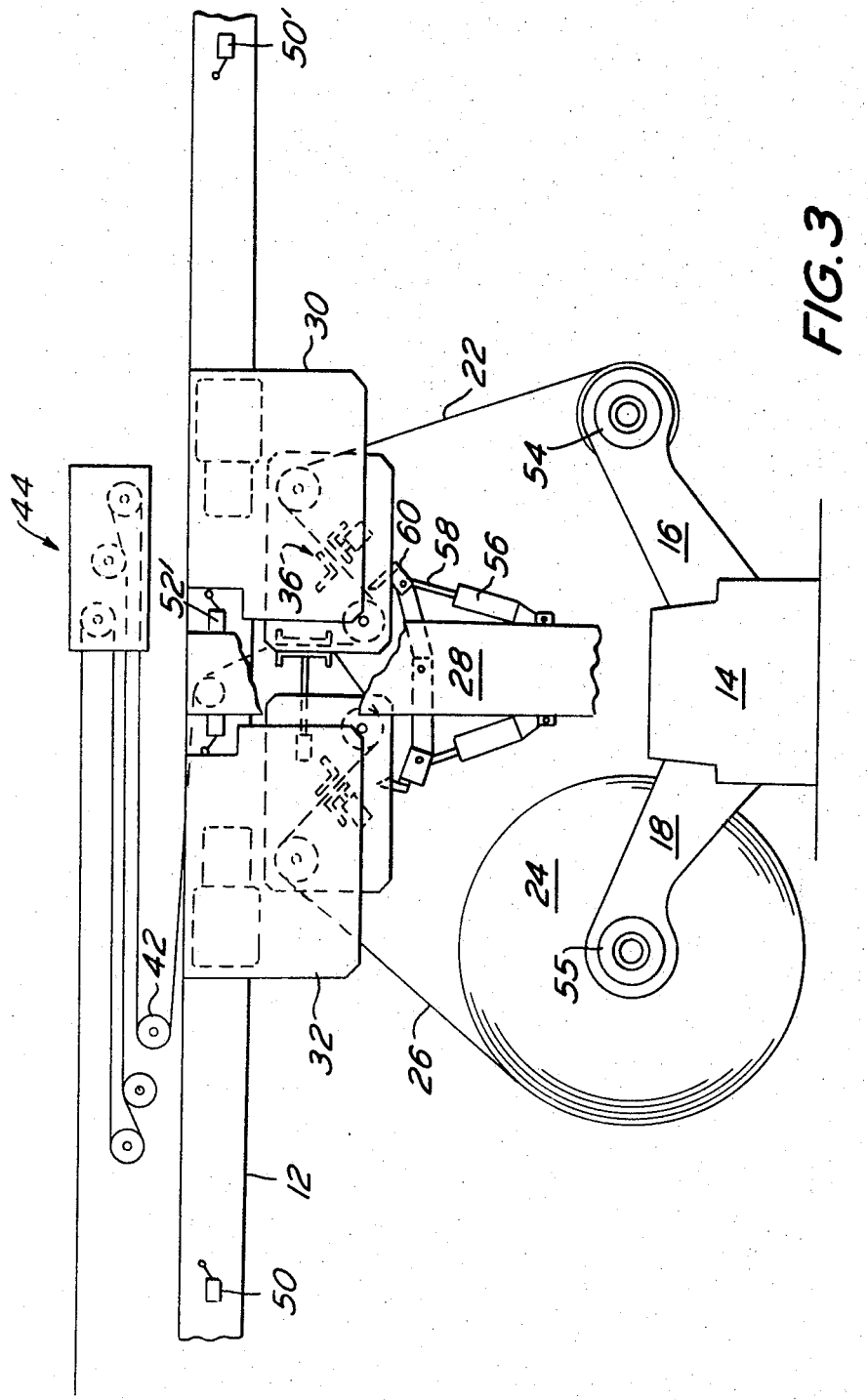

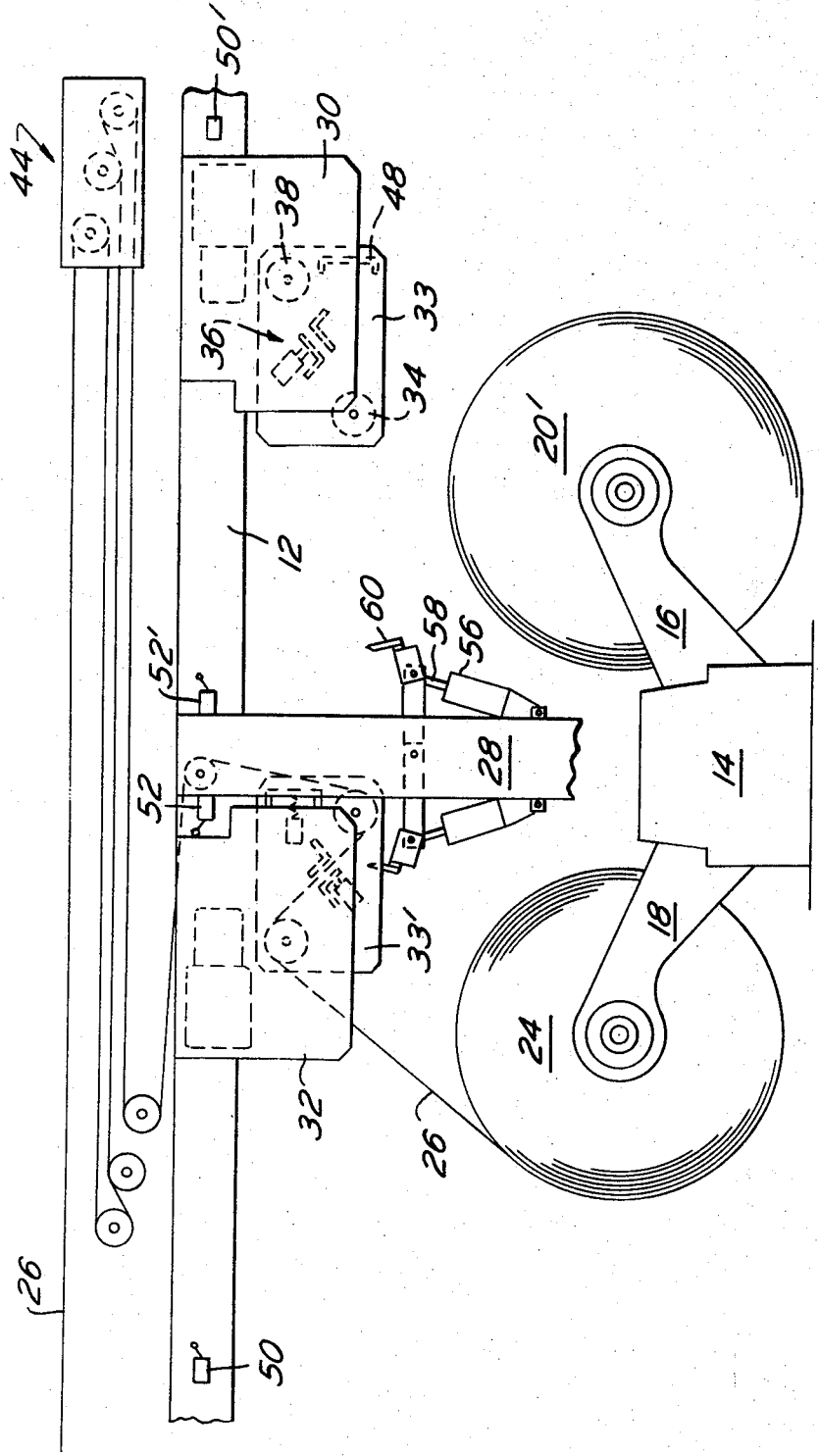

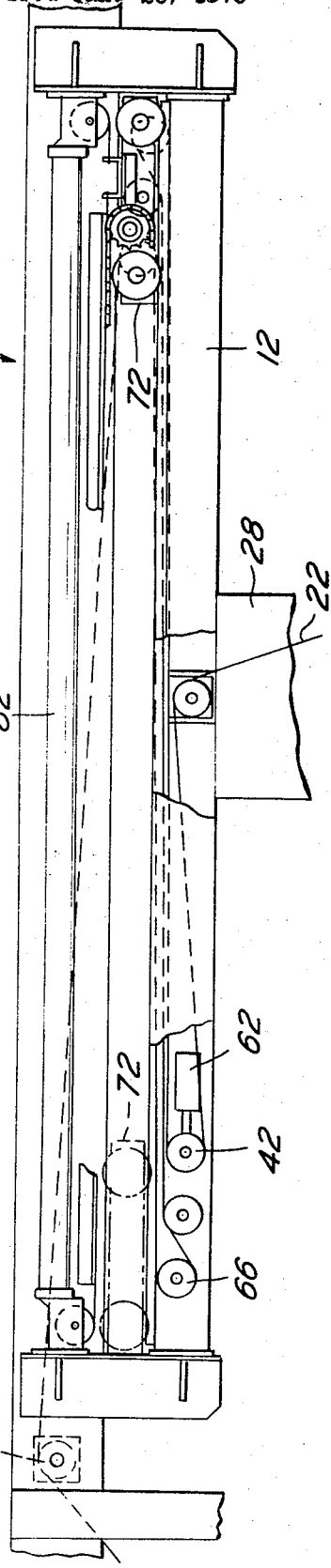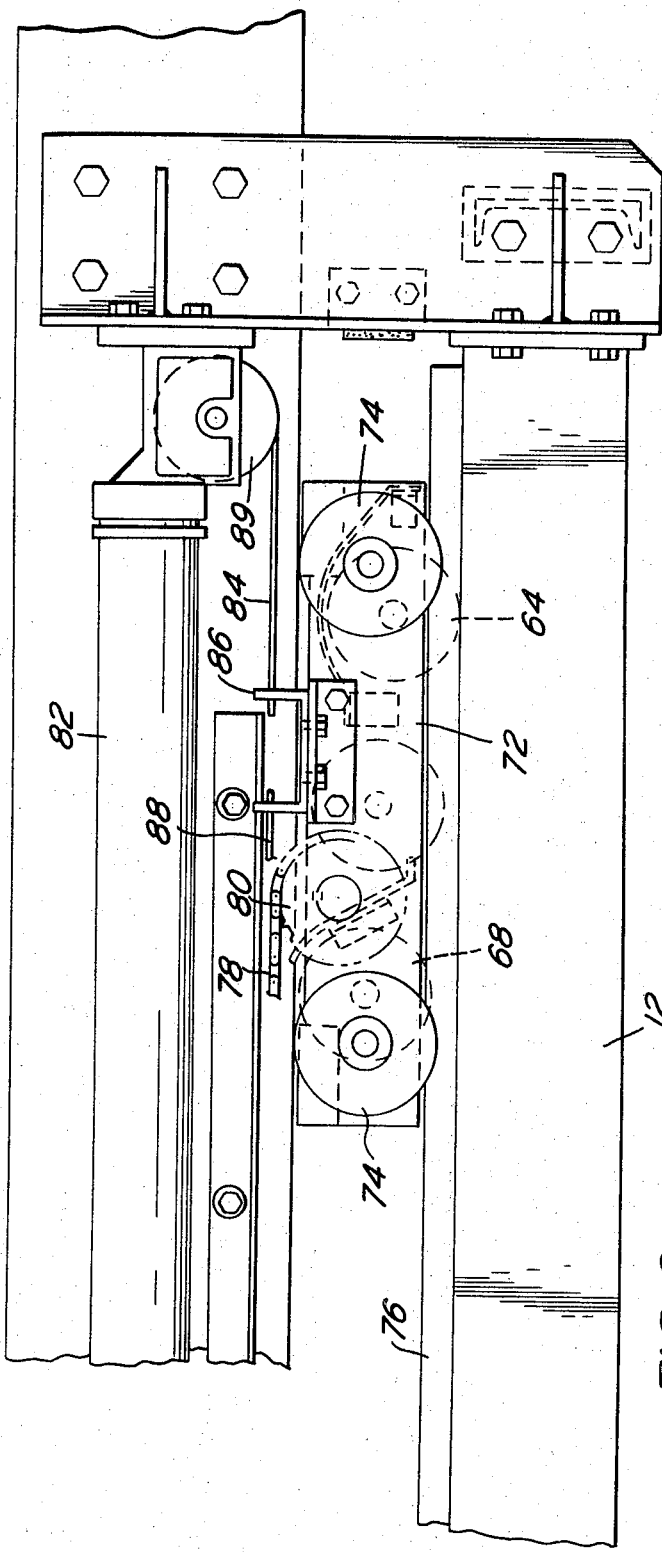

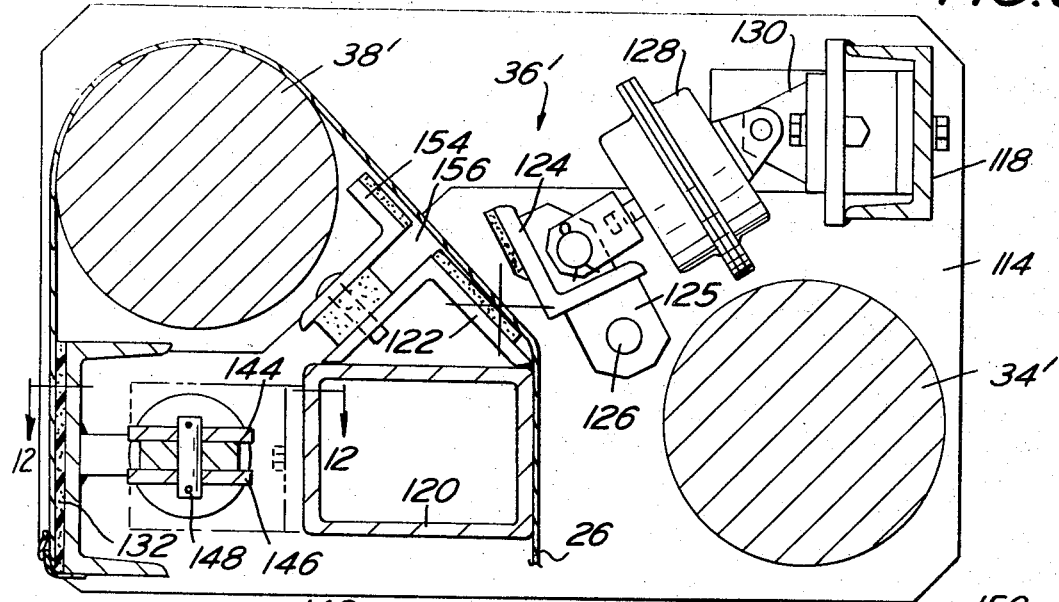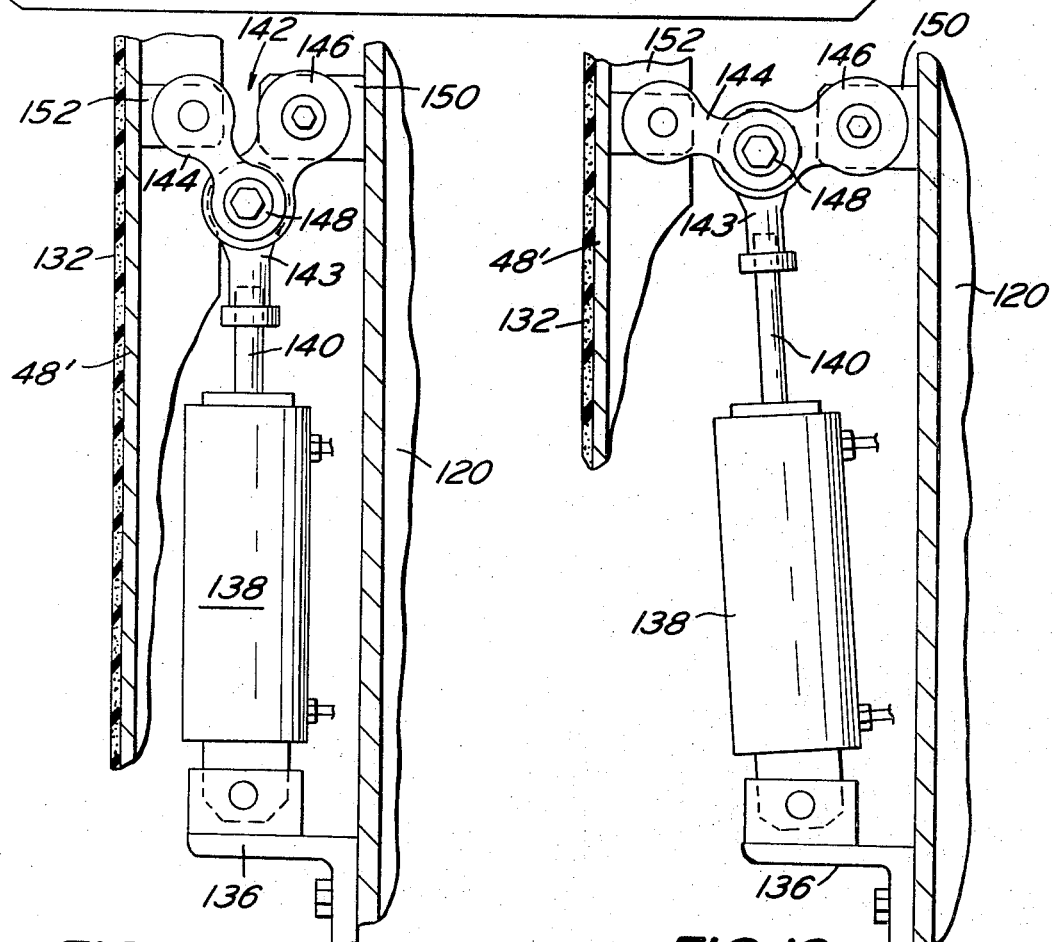

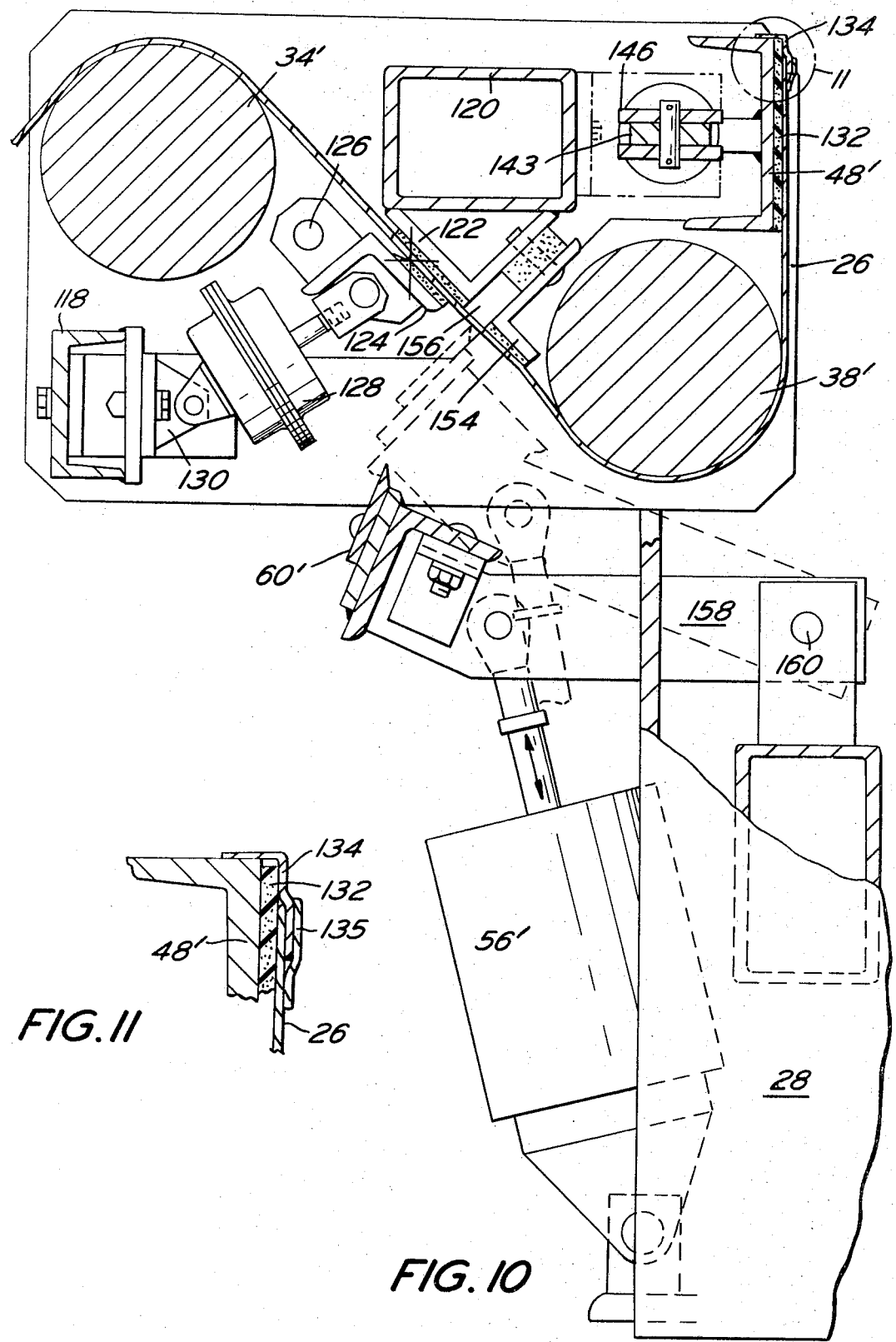

3,841,944
WEB SPLICING APPARATUS
William W. Harris, Jr., Turnersville, N.J., assignor to
Harris-Intertype Corporation, Cleveland, Ohio
Filed June 26, 1973, Ser. No. 373,721
Int Cl. B65h 19/08
U.S. Cl. 156—504                                5 Claims

ABSTRACT OF THE DISCLOSURE

Apparatus is disclosed for splicing a web from a reserve roll to the web from an expiring supply roll whereby a web may be continuously fed to a machine which acts on the web. The apparatus includes a portion of first and second carriages which rotate through an arc as the carriages move towards and away from each other.

---

This invention relates generally to splicing apparatus for supplying a web from rolls to a machine which acts on the web. One such machine is a paperboard corrugator. The splicing apparatus is adapted to splice a web from a reserve roll to the web of an expiring supply roll without retarding continuous operation of the machine which acts on the web.

In the manufacture of corrugated paperboard, three webs namely, a medium and two liners, are fed at speeds up to 750 feet per minute to the corrugator. The webs are combined with an adhesive bonding agent in the single facer and the double facer machines which form a part of the corrugator. Stopping the corrugator to splice in a new roll of paper is wasteful in both time and material. During any such delay to effect a splice, paperboard in the double facer machine may become overheated and spoiled.

Splicers have been used in the printing industry for many years. Those splicers were not adopted by the corrugated paperboard industry for a variety of reasons. For example, splicers used in the printing industry are not suited for use with webs which are brittle and have low tensile strength.

In a preferred embodiment of the apparatus, a roll stand or support is provided. The roll stand or support has pivotably mounted, axially movable arms to support the supply roll and the reserve roll in parallel relationship. The arms are provided with brakes so that the tension of the webs may be regulated. A frame overlies the roll stand or support. First and second movable carriages are supported by the frame.

The first and second carriages are movable toward and away from a splicing station disposed between the carriages. A splice is made at the splicing station. After a splice is made, the supply roll web is cut thereby allowing the reserve roll web to be fed to the machine acting on the web.

While the reserve and supply rolls are stationary, the splice is made. During this period of time, the machine receiving the web and acting on the same is being fed from an accumulation device disposed between the roll stand or support and the machine which acts on the web. The accumulation device may be a festoon mounted on the frame above the roll stand or support. Thus, a web may be continuously fed to the machine which acts on the web notwithstanding the fact that a splice is made when the webs are stationary.

It is a primary object of the invention to provide a web splicing apparatus for splicing the web from one roll to the web from another roll.

It is another object of the present invention to provide splicing apparatus capable of effecting a splice between two webs without retarding the supply of a web to a machine which acts on the web.

It is another object of the present invention to provide a web splicing apparatus for splicing stationary webs in a manner which is simple, positive, and without retarding operation of a machine acting on the web.

Other objects will appear hereinafter.

For the purpose of illustrating the invention, there is shown in the drawing a form which is presently preferred; it being understood, however, that this invention is not limited to the precise arrangement and instrumentality shown.

FIGS. 1–4 are elevation views of apparatus in accordance with the present invention showing components in various positions as a splice is effected between a web from a reserve roll and the web of an expiring supply roll.

FIG. 5 is a side elevation view of a festoon to which a web is fed from the roll stand or support.

FIG. 6 is an enlarged detailed view of the right hand end of FIG. 5.

FIG. 9 is a sectional view taken along the line 9—9 in FIG. 8.

FIG. 10 is a view similar to FIG. 9 but showing the components in the position wherein a splice is being made.

FIG. 11 is an enlarged detail view of the upper right hand corner of FIG. 10.

FIG. 12 is a sectional view taken along the line 12—12 in FIG. 9.

FIG. 13 is a view similar to FIG. 12 but showing the arrangement of the components when a splice is effected.

Referring to the drawing in detail, wherein like numerals indicate like elements, there is shown in FIG. 1 web splicing apparatus in accordance with the present invention designated generally as 10.

A sequence of events during a splice effected by the present invention is sequentially illustrated in FIGS. 1–4.

Figure 1:
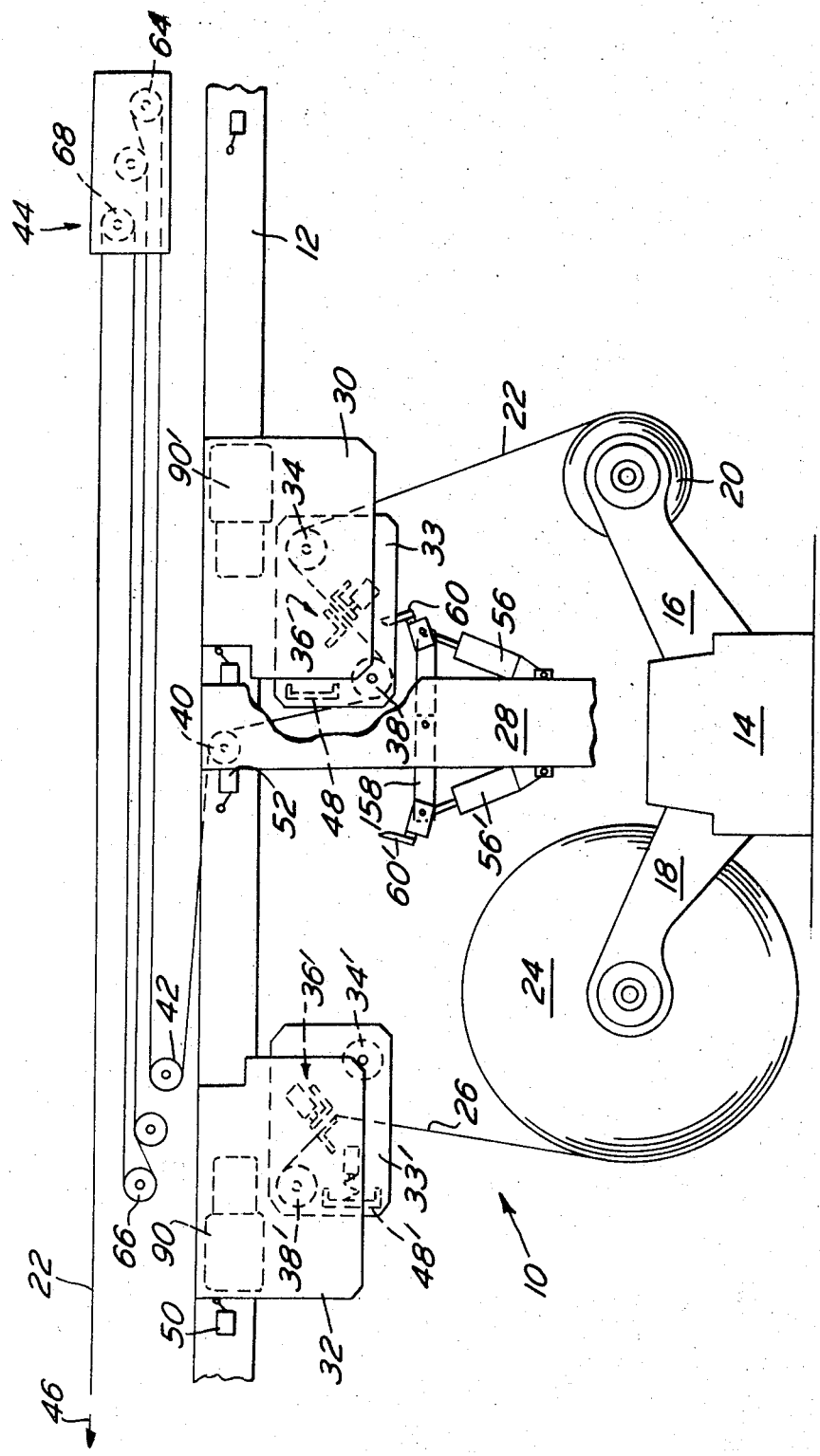

Referring to FIG. 1, the apparatus 10 includes a main frame 12 supported above a roll stand or support 14. The roll stand 14 includes pairs of arms 16 on one side thereof, for supporting the supply roll 20 from which the web 22 is unwound. The arms 16 are movable toward one another and pivotable with respect to a horizontal axis in a manner well known to those skilled in the art.

The roll stand 14 includes a pair of arms 18 on the opposite side thereof. Likewise, the arms 18 are mounted for movement toward and away from each other and for pivotable movement about a horizontal axis. The arms 18 support a reserve roll 24 from which a web 26 is to be unwound. A splicing station 28 is disposed above the roll stand 14 and is supported in depending relation from the frame 12.

First and second carriages 30 and 32 are supported by the frame 12 for reciprocation toward and away from the splicing station 28 which is disposed between the carriages. The carriages 30 and 32 are identical. Accordingly, corresponding prime numerals are applied to corresponding structure on the carriages.

As shown in FIG. 1, carriage 30 is in a position wherein web 22 is fed therethrough. The carriage 30 includes a splicer head 33 which is rotatably supported by the carriage 30. The head 33 includes an idler roller 34 around which the web 22 extends. From the idler roller 34, the web 22 extends through a clamping means designated generally as 36 and then around an idler roller 38.

The web 22 extends from the idler roller 38 upwardly around idler roller 40 on the splicing station 28 and then around a dancer roll 42. From the dancer roll 42, the web 22 extends through a festoon 44 or similar accumulation device and then extends in the direction of arrow 46 to the machine which will act on the web, such as a corrugator.

The splicing head 33 includes a holding surface 48 which faces the splicing station 28 in the operative position of the carriage 30 as shown in FIG. 1. In FIG. 1, the carriage 32 is in an inoperative position. The web 26 extends through the clamping means 36' (which at this point is inoperative), around idler roller 38', and down to the holding surface 48'. The web 26 is releasably and adhesively held on the surface 48' in any convenient manner. An adhesive strip is applied to the exposed end portion of the web 26 for subsequent attachment of web 26 to web 22 as will be explained hereinafter.

In the inoperative position of the carriage 32, the head 33' is disposed in a manner so that the surface 48' extends to the left in FIG. 1 in a direction away from the splicing station 28. In this manner, workmen may stand and thread the web 26 through the splicer head 33' and removably couple the free end of web 26 to the surface 48' in an area which is convenient and remote from the web 22. FIGS. 2–4 reflect how the elements shown in FIG. 1 move when it is desired to splice web 26 to the web 22.

When it is ascertained by observation or by means of a signal that the supply roll 20 is nearly exhausted, a button is pushed to activate a motor which causes the carriage 32 to move away from limit switch 50 toward the splicing station 28. Clamp means 36' is activated to contact and hold the web 26 stationary. As the carriage 32 reciprocates, the splicing head 33' rotates 180°. This rotation is complete when the carriage 32 has travelled its entire stroke up to the point where it contacts limit switch 52. Clamp means 36' is then deactivated to release the web 26. Thus, the carriage 32 assumes the position shown in FIG. 3 where it is juxtaposed to the carriage 30 at the splicing station 28.

When it is desired to effect a splice, the following happens substantially simultaneously: The brake 54 on arm 16 is activated to stop rotation of the supply roll 20. The festoon 44 moves to the left paying out the accumulated portion of web 22. The leading edge of web 26 is moved into contact with and adhered to the web 22. Cylinder 56 is activated so that its piston rod 58 pivots cutter 60 upwardly to cut the stationary web 22 adjacent the clamp means 36. Brake 55 on arm 18 is released allowing web 26 to follow web 22. The festoon 44 then moves to the right accumulating a portion of web 26 in preparation for the next splice.

Thereafter, the carriage 30 is reciprocated from left to right in FIGS. 3 and 4 so as to move to its inoperative position. At any convenient time thereafter, a new reserve roll 20' will be substituted for the remainder of the exhausted supply roll 20. The leading end of the web on roll 20' will be threaded through the head 33 on carriage 30 at the convenience of the operator. It is to be noted that the head 33 has rotated through an arc of 180° as it reciprocated from its operative position in FIG. 3 to its inoperative position in FIG. 4. Limit switches 50' and 52' define the operative limits of reciprocation of the carriage 30.

The cutter 60 extends across the full width of the splicing station 28. One or more of the cylinders 56 may be utilized to simultaneously move the cutter 60. It will be noted that the cylinders 56 are pivotably supported at their lower end by the splicing station 28. Similar corresponding structures provided on the opposite side of the splicing station 28 to effect a severing of the web 26 when the roll 24 is nearly exhausted and it is desired to splice the web from roll 20' to the web 26.

The dancer roll 42 is connected by a piston rod to a dashpot 62 on opposite sides of the frame 12. The dashpot 62 controls pressure applied by the brakes 54 and 55. When tension in the web 22 increases above a predetermined level, the dancer roll 42 moves from left to right in FIG. 5. After the dancer roll 42 has moved to the right a short distance the dashpot 62 actuates a pressure regulator which reduces pressure in the brake 54. Conversely, low tension in the web allows the dancer roll 42 to move from right to left and the pressure in the brake is increased.

The festoon 44 shown diagrammatically in FIGS. 1–4 is shown in detail in FIGS. 5 and 6.

The web 22 extends from the dancer roll 42 to the idler roller 64 which forms a part of the festoon 44. See FIG. 6. From the idler roller 64, the web 22 extends around the idler roller 66 at the left hand end of the frame 12 in FIG. 5. From the idler roller 66, the web 22 extends to the right in FIG. 5 to the idler roller 68 which forms a part of the festoon 44. From the idler roller 68, the web extends from right to left in FIG. 5 to the idler roller 70 and then to the machine which acts on the web.

The idler rollers 64 and 68 are rotatably supported by a carriage 72. See FIG. 6. The carriage 72 is provided with wheels 74 on opposite sides thereof. Each set of wheels 74 rides on a track 76 supported by the frame 12. A chain 78 is secured to opposite sides of the frame 12 and acts as a rack. A gear 80 on opposite sides of the carriage 72 is meshed with one of the chains 78. In this manner, the carriage 72 can reciprocate along the tracks 76 without twisting or skewing.

An elongated cylinder 82 is supported by the frame 12 above the carriage 72. A piston within the cylinder 82 is connected by way of a cable 84 to one end of bracket 86 on the carriage 72. Cable 84 extends around idler roller 89 at one end of the cylinder 82. A similar cable 88 is connected at one end to the bracket 86, extends around an idler roller at the opposite end of the cylinder 82, and is connected to the piston within the cylinder 82. While a splice is being made, the tension in the web 22 as it is consumed causes the festoon carriage 72 to reciprocate from right to left in FIG. 5. The cylinder 82 constitutes a means for causing the carriage 72 to be retracted to its normal operating position at the right hand end of FIG. 5.

Figure 7:
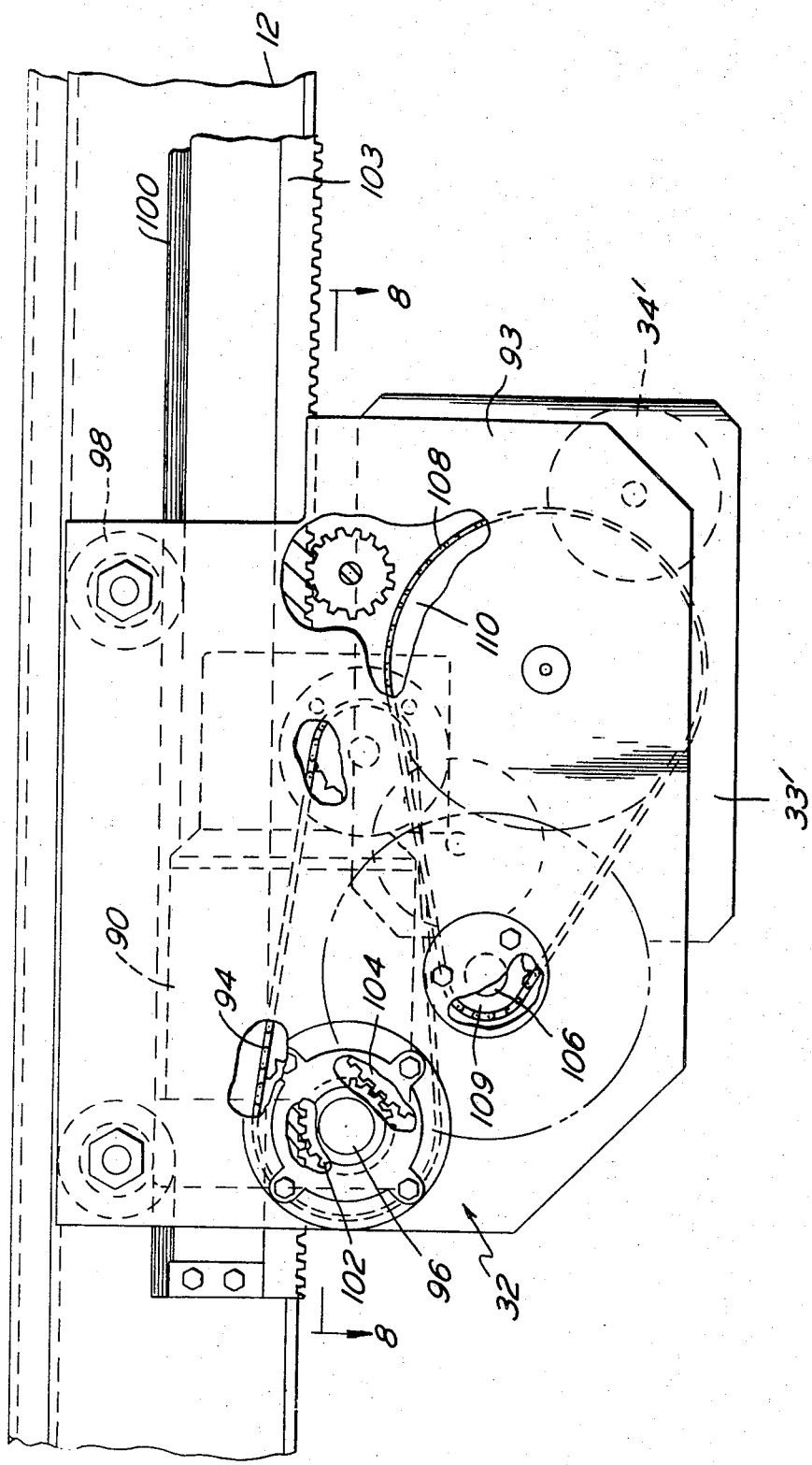
FIG. 7 is a side elevation view of the carriage shown at the left side of FIG. 1.
Figure 8:
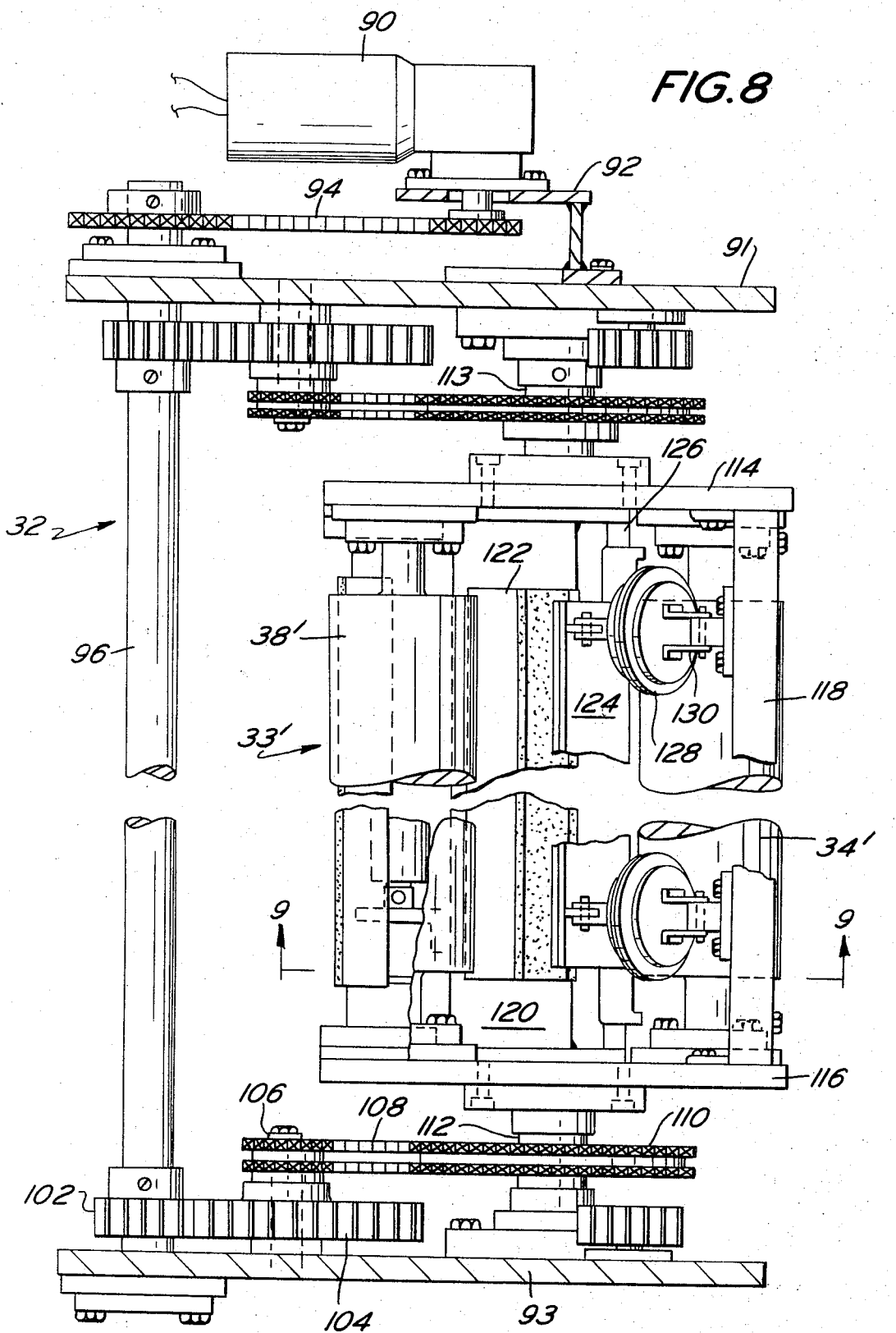
FIG. 8 is a sectional view taken along the line 8—8 in FIG. 7.

Referring to FIGS. 7 and 8, there are shown elements of the carriage 32. The elements of carriage 30 are identical to the elements of carriage 32. Hence, only carriage 32 will be described in detail. Carriage 32 is caused to move along the length of the frame 12 from the inoperative position shown in FIG. 1 to the operative position shown in FIGS. 3 and 4 by means of motor 90. See FIG. 8.

The motor 90 is mounted on a bracket 92. The carriage 32 includes side plates 91 and 93. Bracket 92 is coupled to one of the side plates, namely side plate 91. The side plates 91 and 93 rotatably support a main shaft 96. Shaft 96 is coupled to the output of motor 90 by way of the chain 94. Carriage 32 is provided with a plurality of wheels 98 on opposite sides thereof which ride on tracks 100 supported by the frame 12.

Referring to FIG. 8, the opposite sides of the carriage 32 are identical, except for the motor 90, hence only the lower portion of FIG. 8 will be described in detail. Gear 102 on shaft 96 is meshed with rack 103 supported by the frame 12. Hence, as shaft 96 rotates, the cooperation between gear 102 and the rack 103 causes the carriage 32 to move along the frame 12 from its inoperative position in FIG. 1 to its operative position in FIGS. 3 and 4. Motor 90 is reversible so that the carriage 32 can be moved from the position shown in FIGS. 3 and 4 to the positions shown in FIG. 1.

Gear 102 is also meshed with gear 104 on stub shaft 106. Stub shaft 106 is supported by the side plate 93. Shaft 106 is rotatably coupled to shaft 112 by way of chain 108. Chain 108 extends around sprockets 109 on shafts 106 and sprockets 110 on shaft 112. Shaft 112 is supported by the side plate 93. A similar shaft 113 is supported by the side plate 91. The splicing head 33' is connected to the shafts 112, 113.

The splicing head 33' includes side plates 114 and 116 structurally coupled together by beams 118 and 120. An angled support member 122 is mounted on beam 120. See FIGS. 8 and 9. Member 122 is provided with a pad on a surface thereof as shown in FIG. 9. A clamp bar 124 is pivotably mounted for oscillation about pin 126 by means of arms 125. An expansible chamber device 128 is pivotably connected to the clamp bar 124 by a clevis or similar device. One or more such devices 128 may be utilized. As shown in FIG. 8, two expansible chamber devices are provided. Each of the expansible chamber devices 128 is pivotably connected to a bracket 130 on the beam 118. The clamp bar 124 is adapted to cooperate with the member 122 to clamp the web 26 as disclosed heretofore and constitutes a clamp means 36'.

Referring to FIGS. 9–11, it will be noted that the holding surface 48' is provided with a laminate 132. The laminate 132 is a resilient material to distribute pressure uniformly for the splice. One face of the laminate 132 is joined to the holding surface 48' so as to maintain the laminate 132 thereon. The leading edge of the web 26 is temporarily coupled to the laminate 132 by adhesive tape 134 at two or more locations. A strip of adhesive 135 is applied across the full width of the edge portion of the web 26. The adhesive strip 135 is adapted to be pressed into contact with the trailing end portion of the web 22 as will be made clear hereinafter.

Referring to FIGS. 12 and 13, a motor means is provided to cause the surface 48' to reciprocate for a short distance towards and away from the beam 120. When the carriage 32 is in its inoperative position as shown in FIG. 1, the motor means assumes the position as shown in FIG. 12. When it is desired to effect a splice, the motor means will assume the position shown in FIG. 13.

The motor means for moving the holding surface 48' includes a plurality of cylinders 138. Cylinder 138 is pivotably connected at one end to a bracket 136 on the beam 120. A piston rod 140 extends from the other end of the cylinder and terminates in a flat rod end 143. The flat rod end 143 is connected to a linkage 142.

The linkage 142 includes links 144 and 146. The flat rod end 143 is sandwiched between the links 144, 146 and they are pivotably coupled together by means of a pin 148. Link 144 is also pivotably connected to a bracket 152 on the inner surface of the holding surface 48'. Link 146 is also pivotably connected to a bracket 150 on the beam 120.

As shown in FIGS. 9 and 10, an anvil 154 is bolted to the angled support member 122 with a spacer therebetween so as to define a gap 156. When the roll 24 is substantially exhausted, and it is desired to splice the web from roll 20' to the web 26, the cylinder 56' will be activated to cause the cutter 60' to enter the gap 156 and sever the web 26. The cutter 60' is supported by arms 158 mounted for pivotable movement about pin 160 supported by a portion of the splicing station 28. The piston rod extending from cylinder 56' is pivotably connected to one of the arms 158. As indicated heretofore, a plurality of the cylinders 56' are provided and simultaneously actuated to move the cutter 60'.

In view of the above detailed description of the apparatus of the present invention, it is believed that the following brief description of sequences of events will be adequate to enable those skilled in the art to understand the present invention. Let it be assumed that web 22 is being fed to a machine which acts on the web such as a corrugator. Also, let it be assumed that web 26 has been threaded through the splicer head 33' and has its lead edge removably secured to the laminate 132 on the holding surface 48'. Thereafter, motor 90 is started to cause the carriage 32 to reciprocate from the position shown in FIG. 1 to the position shown in FIG. 3. Clamp means 36' holds web 26 stationary during movement of carriage 32. As the carriage 32 reciprocates up to the microswitch 52, the splicer head 33' rotates through an arc of 180° from the position shown in FIG. 9 to the position shown in FIG. 10.

In FIG. 10, the carriage 32 is shown in the position that it occupies when a splice is to be effected. When a splice is effected, the horizontal reciprocation of the holding surface 48' affected by the movement of the linkage 142 from the position shown in FIG. 12 to that shown in FIG. 13 causes the adhesive strip 135 to be pressed onto the trailing portion of the web 22.

When web 26 is spliced to web 22, the following occurs substantially simultaneously. Brake 54 is applied to stop unwinding roll 20. Dancer roll 42 is moved from left to right in FIG. 1 and activates a pressure regulator which releases the brake 55 for the roll 24. Cylinders 138 are activated to cause the linkage 142 to move from the position shown in FIG. 12 to the position shown in FIG. 13 whereby web 26 will be secured to the web 22 by way of the adhesive strip 135. Cylinders 56 will be activated to move the cutter 60 so that it moves up into a gap corresponding to gap 156 to sever the web 22.

The cutter 60 is then retracted by its cylinders 56. The holding surface 48' is retracted from the position shown in FIG. 13 to the position shown in FIG. 12. The tension on the web 22 will have caused the festoon carriage 72 to reciprocate from right to left in the drawings. The web 26 is now connected to the trailing edge of web 22 and is being paid out from the roll 24. As the spliced joint moves upwardly, tape 134 is pulled upwardly and is disengaged from the head 33'.

Cylinder 82 is activated to cause the carriage 72 to return to its normal operating position at the right hand end of FIGS. 5 and 6. Motor 90' is activated to cause the carriage 30 to reciprocate from the position shown in FIG. 1, to the position shown in FIG. 4. Clamp means 36 holds the tail of web 22 stationary as carriage 30 moves. As the carriage 30 moves from left to right in FIG. 4, the splicer head 33 rotates through an arc of 180° so that the holding surface 48 will be positioned in a manner whereby the tail of web 22 may be removed. The leading end of a new web from roll 20' may be threaded through head 33 and temporarily coupled to the holding surface 48. As soon as the reserve roll 24 becomes depleted, the process is repeated whereby the web from roll 20' may be spliced to the web 26.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus for splicing a web from a reserve roll to a web of a supply roll comprising means for supporting a reserve roll and a supply roll, a frame associated with said supporting means and at an elevation thereabove, first and second carriages movably supported by said frame for movement toward and away from each other, each carriage including at least one idler roller around which a web from one of the rolls may extend, an accumulation means for accumulating a supply of a web fed from one of the rolls, means supported by said frame independently of and below an anvil on said first carriage to sever the web being fed, and means on the second carriage for selectively moving the leading edge of a web from a reserve roll relative to said second carriage into contact with and for securement to the web being fed substantially at the same time the web being fed is severed.

2. Apparatus in accordance with claim 1 wherein each carriage includes a rotatably mounted splicer head, motor means for selectively reciprocating each carriage, each motor means being coupled to the splicer head on its respective carriage for rotating the splicer head as the carriage reciprocates, each splicer head including a holding surface to which a leading edge of a web from a reserve roll may be removably attached, and each splicer head including a clamp means for selectively clamping a web.

3. Apparatus in accordance with claim 2 wherein said means for selectively moving the leading edge of a web includes a holding surface on the splicer head and motor means on the splicer head for reciprocating the holding surface.

4. Apparatus in accordance with claim 2 wherein said means for severing the web being fed includes first and second discrete cutter blades on said frame adjacent an operative position of said first and second carriages, each cutter blade being associated with one of said carriages, and a discrete motor means for selectively moving a cutter blade upwardly to sever a web threaded through its associated carriage.

5. Apparatus for splicing a web from a reserve roll to a web from a supply roll of material used in connection with making corrugated paperboard comprising a roll stand having a first set of arms for supporting a supply roll and a second set of arms for supporting a reserve roll, a frame disposed above the elevation of said roll stand, first and second carriages movably supported by said frame for movement to and from a splicing station on said frame above said roll stand, each carriage including a splicing head adapted for the threading of a web therethrough, an accumulation means including a carriage movably supported on said frame for accumulating a supply of web fed from one of the rolls, and said splicing station including a discrete pivotably mounted upwardly directed cutter blade on said frame and associated with an anvil on one carriage for severing the web through said one carriage while the carriage is in an operative disposition adjacent the splicing station, and said one carriage including a clamp means for clamping a web associated therewith prior to severing the web by said cutter blade.

References Cited
UNITED STATES PATENTS

| | | | |
|---|---|---|---|
| 3,440,126 | 4/1969 | Bartholomay et al. | 156—505 |
| 3,298,890 | 1/1967 | Hellemans | 156—504 |
| 3,627,616 | 12/1971 | Davis | 156—502 |
| 3,738,587 | 6/1973 | Cristiani | 242—58.1 |
| 2,987,108 | 6/1961 | Kilmartin | 242—58.1 X |
| 2,035,682 | 3/1936 | Wikle | 242—58.4 X |

WILLIAM A. POWELL, Primary Examiner

B. J. LEITTEN, Assistant Examiner

U.S. Cl. X.R.

156—159, 507; 242—58.1, 58.4